(12) United States Patent
Wu et al.

(10) Patent No.: US 7,720,086 B2
(45) Date of Patent: May 18, 2010

(54) DISTRIBUTED OVERLAY MULTI-CHANNEL MEDIA ACCESS CONTROL FOR WIRELESS AD HOC NETWORKS

(75) Inventors: Haitao Wu, Beijing (CN); Kun Tan, Beijing (CN); Jun Zhao, Beijing (CN); Yongguang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 11/687,951

(22) Filed: Mar. 19, 2007

(65) Prior Publication Data

US 2008/0232389 A1 Sep. 25, 2008

(51) Int. Cl.
  *H04J 4/00* (2006.01)
(52) U.S. Cl. ...................................... 370/436
(58) Field of Classification Search ................. 370/436, 370/431
  See application file for complete search history.

(56) References Cited

U.S. PATENT DOCUMENTS

| | | | |
|---|---|---|---|
| 6,829,216 B1* | 12/2004 | Nakata ....................... | 370/228 |
| 7,079,509 B2 | 7/2006 | Belcea | |
| 7,403,748 B1* | 7/2008 | Keskitalo et al. ............ | 455/101 |
| 2002/0044533 A1* | 4/2002 | Bahl et al. ................... | 370/255 |
| 2002/0060995 A1* | 5/2002 | Cervello et al. ............. | 370/332 |
| 2003/0219001 A1 | 11/2003 | de Prado Pavon et al. | |
| 2004/0042424 A1 | 3/2004 | Hsien-Tsung | |
| 2004/0240422 A1* | 12/2004 | Kim ........................... | 370/348 |
| 2004/0258040 A1 | 12/2004 | Joshi et al. | |
| 2005/0180356 A1 | 8/2005 | Gillies et al. | |
| 2006/0114851 A1 | 6/2006 | Gupta et al. | |
| 2006/0256742 A1 | 11/2006 | Lee et al. | |
| 2006/0280152 A1 | 12/2006 | Lee et al. | |
| 2006/0281479 A1 | 12/2006 | Lee et al. | |

FOREIGN PATENT DOCUMENTS

KR  20060010018  2/2006

OTHER PUBLICATIONS

Geier Jim. "802.11 Beacons Revealed" Oct. 31, 2002. http://www.wi-fiplanet.com/tutorials/article.php/1492071.*
Eladly, et al., "An Overlay Algorithm to Improve the Support of Multi-Hopping in the IEEE 802.11 WLANs", available at least as early as Feb. 27, 2007, at <<http://ieeexplore.ieee.org/iel5/9179/29132/01313267.pdf?isNumber=>>, IEEE, 2004, pp. 3817-3821.

(Continued)

*Primary Examiner*—Huy D Vu
*Assistant Examiner*—Stephen J Clawson
(74) *Attorney, Agent, or Firm*—Lee & Hayes, PLLC

(57) ABSTRACT

Systems and methods for distributed overlay multi-channel MAC for wireless ad hoc networks are described. In one aspect, the systems and methods divide channel frequencies defined by a wireless network protocol into a single home channel and multiple guest channels that are orthogonal to the home channel. Each of the network nodes in the ad hoc network operates on the home channel for respective variable and overlapping amounts of time to maintain network connectivity with other respective network nodes. Additionally, each of the network nodes determines whether and when to switch from the home channel to a particular guest channel of the guest channels for a variable amount of time to increase data throughput over one or more corresponding communication links in the ad hoc network with other network node(s).

14 Claims, 9 Drawing Sheets

OTHER PUBLICATIONS

Hung, et al., "A Dynamic Multi-Channel MAC for Ad Hoc LAN", available at least as early as Feb. 27, 2007, at <<http://jangkw37.ptopworld.com/jangkw/%B3%ED%B9%AE/Multichannel/A%20Dynamic%20Multi-Channel%20MAC%20for%20Ad%20Hoc%20LAN.pdf>>, pp. 1-5.

So, et al., "A Multi-channel MAC Protocol for Ad Hoc Wireless Networks", available at least as early as Feb. 27, 2007, at <<http://path.berkeley.edu/dsrc/reading/mmac.pdf>>, pp. 1-14.

PCT Search Report for PCT Application No. PCT/US2008/057514, mailed Jul. 17, 2008 (10 pages).

* cited by examiner

DISTRIBUTED OVERLAY MULTI-CHANNEL MEDIA ACCESS CONTROL FOR WIRELESS AD HOC NETWORKS

BACKGROUND

IEEE 802.11 is a technology standard for WLAN (Wireless LAN), which has been widely used for both infrastructure and ad hoc networks. Nodes in an ad hoc network are typically configured to communicate with other node(s) in the ad hoc network over a single (same) channel frequency. With an increase in transmitting network nodes, channel capacity eventually becomes a data throughput bottleneck.

FIG. 1 shows an ad hoc network 100 including some number of computing device network nodes ("nodes"), for example, nodes 1 through 6. In this example, each of the nodes 1-6 is configured to communicate with specific ones of the other nodes over a same single channel frequency (e.g., channel 1) using 802.11 standard communications. However, and since only one node can transmit at any particular time, each node pair utilizes at most ⅓ of the channel's data-throughput capacity. If too many nodes attempt to communicate at a same time over the same channel, data throughput performance rapidly degrades.

To mitigate mutual data transmission interference on a same spectrum band, the IEEE 802.11 standard provides for multiple orthogonal frequency channels, essentially increasing network data throughput capacity. For example, 802.11b defines eleven (11) channels; three (3) of which are orthogonal (non-overlapped), and 801.11a defines thirteen (13) orthogonal channels. FIG. 2 shows ad hoc network 200 with node-pairs communicating on different orthogonal channels to reduce mutual transmission interference. In this example, node pairs (1, 2) operate over channel 6, node pairs (3, 4) operate over channel 1, and node pairs (5, 6) operate over channel 11. Each of the arrows showing traffic patterns 202 through 206 include different fill (e.g., hatching) to represent different traffic volume across respective ones of the links between the illustrated nodes. In this scenario, although each node pair can simultaneously transmit data, a node communicating over a particular channel will not be able to communicate with any node configured to communicate over a different channel.

Software-controlled channel assignment and switching techniques have been developed to address some of the described limitations. These conventional techniques allows nodes to communicate on a respective channel frequency, and at the same time, maintain connectivity to nodes configured to transmit over different channels to accommodate different traffic patterns, by allowing. An exemplary such scenario is shown in FIG. 3, where node 3 on channel 1 maintains link connectivity to both node 2 on channel 6 (see traffic pattern 302) and node 6 on channel 11 (see traffic pattern 304). However, existing channel switching techniques typically use a fixed pattern to emulate all possible arbitrary traffic and connectivity patterns in an ad hoc network. Such emulation is substantially problematic because it assumes that all nodes will follow similar same behavior, which is not always the case.

One conventional channel switching technique, for example, provides for a transmitting node to switch channels after each packet transmission. Such packet-by-packet switching operations often result in prohibitive amounts of processing overhead due to the corresponding time-consuming channel switching latencies. For instance, packet transmission time in 802.11 is approximately 300 microseconds (us). Even if a NIC can switch as fast as 100 us and two nodes can synchronize with ms accuracy, packet switching overhead in such a packet-b-packet level channel switching scheme is still an excessive 33%. In another example, a component-based conventional channel switching technique configures all nodes in a particular communication session to transmit on a same channel. In this technique, the channel does not change for the duration of the communication session. Although this essentially reduces channel switching latencies as compared to the packet-by-packet switching schemes, this technique is least flexible in using channel diversity.

For example, existing component-based channel assignment techniques would not be able to achieve throughput gain for ad hoc network configurations such as shown in FIG. 4, which represents a combination pattern of FIGS. 2 and 3. Referring to FIG. 4, traffic patterns 402 through 410 across respective ones of channels 1, 6 and 11 are illustrated. As shown, some nodes always communicate on the same channel. For instance, nodes 1 and 2 in this example communicate on only channel 6 (see traffic pattern 402) and nodes 5 and 6 communicate only on channel 11 (see traffic pattern 406). Other nodes work across multiple channels. For instance node 3 in this example sometimes works on channel 1, for instance, to communicate with node 4 (see traffic pattern 404). Node 3 of this example is also configured to operate over channel 6 to communicate with node 2 (see traffic pattern 408), and over channel 11 to communicate with node 6 (see traffic pattern 410). Although existing MAC level channel switching schemes can achieve throughput gain and maintain node connectivity for the illustrative ad hoc network of FIG. 4, existing MAC level channel switching schemes are somewhat limited in such scenarios.

For instance, conventional MAC level channel switching schemes switch channels only at edges of predetermined and fixed time slots, wherein all packets in a particular time slot are transmitted on the same channel. Such conventional super-frame level schemes are limited. For instance, existing MAC level channel switching schemes generally require a node to change channels consistently on a per super-frame or time slot basis, making such schemes too inflexible to accommodate large channel switching latencies. Additionally, existing MAC level channel switching schemes divide a super-frame into control and data time, which may be substantially problematic. For instance, such dividing a super-frame in this manner may cause: (a) underutilization of data time; (b) substantial data throughput delays decreasing response time per hop due to a one-service opportunity per super-frame; and (c) a control channel time-bottleneck because each node is typically required to send a signaling message to contend access on a per super-frame basis. Furthermore, such MAC level schemes are incompatible with legacy 802.11-based systems, either requiring modifications to the 802.11 MAC (e.g., extending the power saving mode) or use of a proprietary MAC.

SUMMARY

Systems and methods for distributed overlay multi-channel MAC for wireless ad hoc networks are described. In one aspect, the systems and methods divide channel frequencies defined by a wireless network protocol into a single home channel and multiple guest channels that are orthogonal to the home channel. Each of the network nodes in the ad hoc network operates on the home channel for respective variable and overlapping amounts of time to maintain network connectivity with other respective network nodes. Additionally, each of the network nodes determines whether and when to switch from the home channel to a particular guest channel of the guest channels for a variable amount of time to increase data throughput over one or more corresponding communication links in the ad hoc network with other network node(s).

This Summary is provided to introduce, in a simplified form, a selection of concepts that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Systems and methods for distributed overlay multi-channel MAC (OMMAC) for ad hoc networks are described. The distributed OMMAC provides a framework to maintain node-to-node connectivity and optimize data throughput (i.e., performance) in an ad hoc network. To this end, the systems and methods identify a channel frequency over which network nodes ("nodes") can periodically synchronize to maintain node-to-node connectivity. This synchronization channel is the "home channel", which is the same for all nodes in the ad hoc network. In this implementation, the home channel represents the channel frequency over which nodes first synchronized when in the ad hoc network was initially configured (i.e., established). The systems and methods then identify multiple channel frequencies orthogonal to the home channel. These orthogonal channels are "guest channels". The nodes collectively implement a distributed and time synchronized channel scheduling and switching algorithm based on the home channel and the guest channels. Specifically, all of the nodes to operate on the home channel for variable and overlapping amounts of time to periodically broadcast traffic and channel information to other ones of the nodes, and thereby, maintain network connectivity. Additionally, each node in the ad hoc network independently determines whether and when to switch from the home channel to a particular guest channel for a variable amount of time to locally-optimize data throughput in the ad hoc network.

These and other aspects of the systems and methods for distributed OMMAC for ad hoc networks are now described in greater detail.

An Exemplary System

Figure 5:
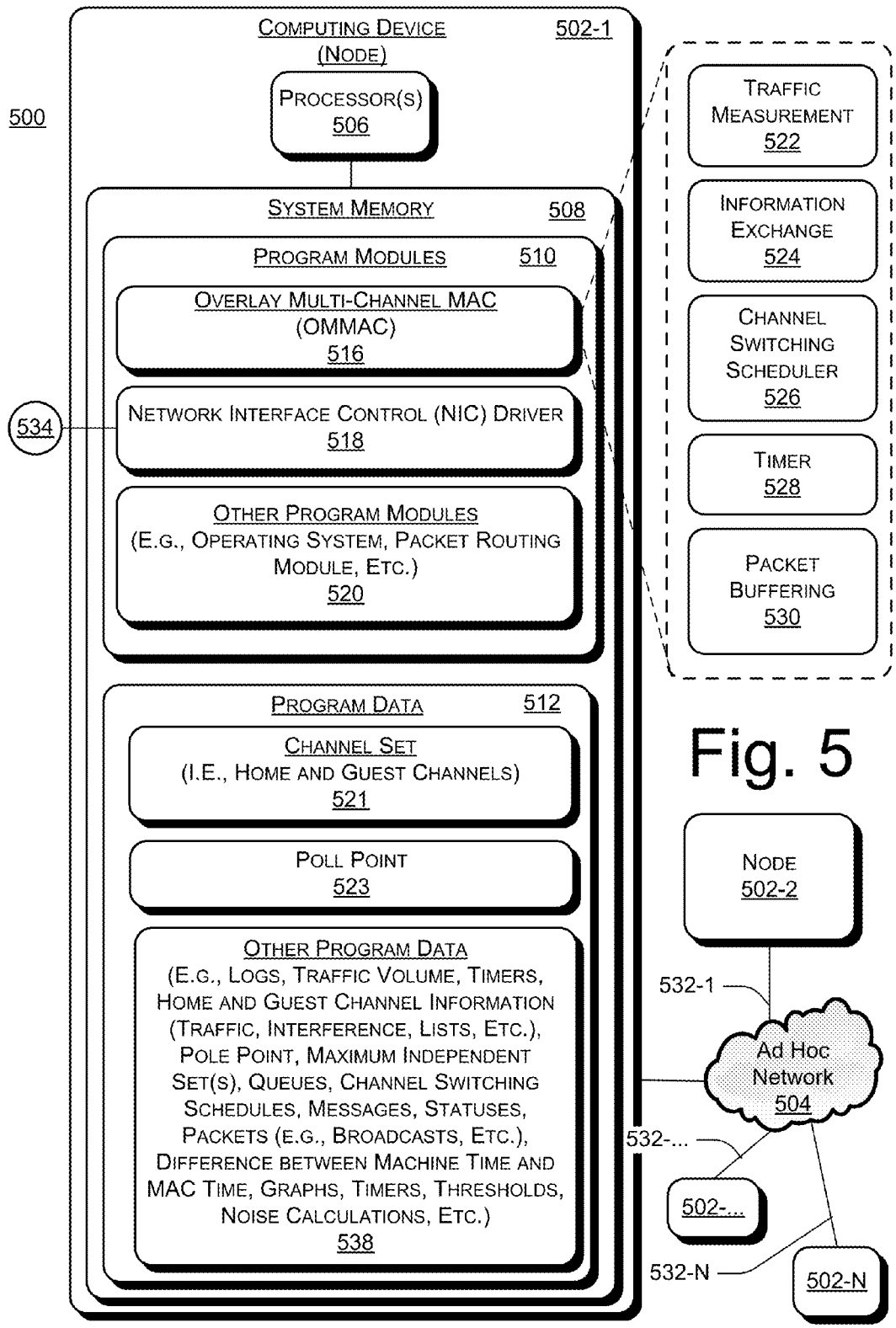
FIG. 5 shows an exemplary system for distributed overlay multi-channel MAC for ad hoc networks, according to one embodiment.

FIG. 5 shows an exemplary system 500 for distributed overlay multi-channel MAC (OMMAC) for ad hoc networks, according to one embodiment. In this implementation, system 500 includes multiple networked computing devices 502-1 through 502-N ("nodes") wirelessly coupled to one another over ad hoc network 504. Each node 502 is a respective computing device such as a general-purpose computing device (e.g., a personal computer), server, a portable computing device such as a laptop computer, a small-form factor-computing device such as a personal digital assistant (PDA), etc. Nodes 502 communicate directly with one another over network 504 without using an access point. The OMMAC is distributed because each node 502-1 through 502-N (i.e., "nodes 502") implements a local version of the OMMAC to maintain node-to-node network connectivity and enforce a channel switching policy in view of precise synchronization requirements specified by the underlying wireless modulation techniques of a protocol. In this implementation, the protocol is IEEE 802.11, although the concepts described with respect to the systems and methods are applicable to wireless network protocols.

Each node 502 includes one or more processors coupled to system memory comprising computer-program modules executable by respective ones of the processor(s) to implement the distributed OMMAC for ad hoc networks. Such system memory also includes program data generated and/or used by respective ones of the computer-program instructions during program module execution. For example, node 502-1 includes one or more processors 506 coupled to system memory 508 representing volatile random access memory (RAM) and non-volatile read-only memory (ROM). System memory 508 includes program modules 510 comprising computer-program instructions executable by processor(s) 506. System memory 508 also includes program data 512 generated and/or used by respective ones of the computer-program instructions during program module execution. In this implementation, for example, program models 508 includes overlay multi-channel MAC (OMMAC) module 516, a Network Interface Control (NIC) driver 518, and other program modules 520 such as an operating system to provide a runtime environment, a packet routing module to respectively route and receive information to/from OMMAC module 516, etc.

An Exemplary Framework

OMMAC 516 maintains node-to-node 502 connectivity in network 504 and enforces a distributed channel switching policy in view of precise synchronization requirements specified by the underlying wireless modulation techniques of a protocol. For purposes of illustrating one exemplary embodiment, operations of OMMAC 516 are described with respect to the exemplary protocol of IEEE 802.11. To maintain node-to-node 502 connectivity and enforce a distributed channel switching policy in view of the underlying synchronization requirements, OMMAC 516 divides the available communication channel frequencies into a single home channel and multiple guest channels. The single home channel and the multiple guest channels are collectively represented in FIG. 5 as "channel set" 521. Each node 502 uses the home channel to maintain network connectivity with other node(s) 502. Guest channels are selectively used (according to the below described channel switching and scheduling algorithm) by respective ones of nodes 502 to increase network 504 data throughput (performance).

1. Home Channel

In this implementation, the home channel is determined as follows. An initiator node 502 scans all available channel frequencies and selects one with the least noise as the home channel. All nodes 502 can be reached by a node 502 over the home channel via a broadcast message. In this implementation, each node 502 votes for or against the home channel via broadcast messages (ACK/NACK messages) based on local observations of noise on the home channel. For example, in one implementation, if the number of broadcast ACK message is received are greater than some percentage (e.g., 50%, etc.) of the stations in timeout mode (for some configurable number of time cycles), then a new home channel is determined and voted on by nodes 502. In this implementation, the home channel is not constrained to a fixed channel frequency and can be dynamically adjusted (migrated) by nodes 502 according to communication link status. In a different implementation, criteria other than channel noise is used to select a home channel.

2. Guest Channels

Channel frequencies orthogonal to the home channel are guest channels. A node 502 communicates with a different node 502 over a guest channel to increase data throughput (i.e., performance) of network 504. In this implementation, OMMAC 516 sorts the guest channels according to interference observed on that channel. Such interference for a particular node 502 is the averaged observation result by all other nodes) 502 in broadcast range of the particular node 502. (Many OMMAC 516 operations are performed at a node level based on OMMAC 516 information from other node(s), and thus the term "distributed OMMAC"). In this implementation, each node 502 detects a respective interference level on the home channel and guest channels over which the node respectfully operates. In this scenario, the node 502 communicates such information in periodic broadcast messages to other nodes 502 in its broadcast range. In this implementation, a node's local OMMAC 516 implements channel switching and scheduling operations such that a guest channel with least interference is utilized for node-to-node communications first.

3. Node Pole Points

The amount of time that a node 502 stays on the home channel is: (a) variable; (b) partially overlapped with the time that neighboring node(s) 502 covering a particular network beacon are also on the home channel; and (c) a function of bidirectional traffic over a communication link between the node 502 and other node(s) 502 within broadcast range of the node 502. When a node 502 is not on the home channel, the node 502 is on a guest channel. In view of the above, each node 502 is respectively configured by its local OMMAC 516 to determine if and when the node should switch from the home channel to a scheduled guest channel to improve data throughput. Each node's local OMMAC 516 defines a channel switching point (i.e., a "pole point") for the particular node 502. A node's pole point is defined with respect to a periodic time cycle ("$T_c$") that is based on the particular beacon interval of the wireless protocol being utilized (e.g., IEEE 802.11, etc.). For purposes of exemplary illustration, a nodes' pole point is shown as "pole point" 523.

Figure 6:
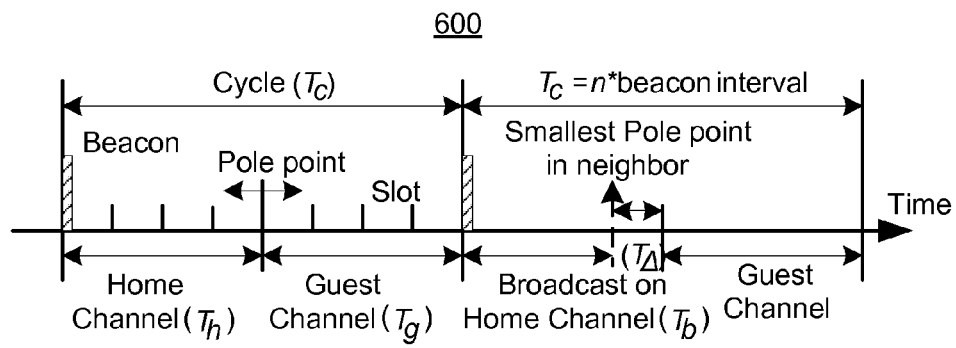
FIG. 6 shows an exemplary illustration of a periodical time cycle $T_c$ utilized by channel switching scheduler logic, according to one embodiment.

FIG. 6 shows an exemplary illustration of a periodical time cycle $T_c$ utilized by each node's channel switching scheduler logic (this logic is implemented by OMMAC 516), according to one embodiment. For purposes of exemplary illustration and description, and aspects of FIG. 6 are described with respect to components of FIG. 5. In the description, a leftmost numeral of a reference number indicates the particular figure where the referenced component was first introduced. Referring to FIG. 6, it is shown that $T_c$ represents a collective amount of time that each node 502 is configured to operate on a combination of the home channel and a guest channel. Specifically, each node 502 is locally configured (i.e., by OMMAC 516) to operate over the single home channel for a particular and variable amount of time ("$T_h$"). Each node 502 is further locally configured to operate over a particular one of the multiple guest channels for a particular and variable amount of time ("$T_g$"). Thus, $$T_c = T_h + T_g \quad (1)$$

In this implementation, the length of a cycle is an integer n determined by multiplying a beacon interval associated with the underlying wireless protocol. For example, a default beacon interval for nodes configured to implement the IEEE 802.11 standard is 100 time units (TU), which is 1024 ms.

As shown in FIG. 6, time cycle $T_c$ is divided into a multiple number m of slots. A slot represents the granularity of time that a node is scheduled on a channel. For example, if a periodic cycle is 102.4 ms (n=1), and m=8, i.e., each cycle is divided into 8 slots, then OMMAC 516 adjusts home and guest channel time by a granularity of 12.8 ms. The pole point indicates a particular time for a node 500 to jump/switch from one channel to another channel. Different nodes 502 may define their own pole points, but the sender and receiver pair of a particular wireless link synchronize respective pole points and jump to a same channel at the same time (described in greater detail below in the section titled "Exemplary Time Synchronization"). In this implementation, pole points are restricted at the boundaries of slots. Therefore, an integer value represents a pole point. For example, if m=8 then 1-byte (8-bits) can be used to denote a pole point. In this implementation, for example, there can be multiple pole points in one cycle. In addition, the pole point of a link between two nodes is adjusted according to the traffic volume on the link, as discussed in greater detail below.

At the beginning of a cycle, all nodes 502 return to the home channel and stay on home channel for at least $T_b$, which is called broadcast time. OMMAC 516 schedules broadcast packets to transmit within this time period of each cycle. In this implementation, for example, a node 502 may stay at home channel longer than $T_b$, i.e. $T_h > T_b$. Let $T_A = T_h - T_b$. During that time, the node is still on home channel but for unicast messages. The pole point in slot, i.e., $T_h$, is valid in range [b,m]. If $T_h$ equals to m, then the corresponding node 502 remains on the home channel for the entire cycle and no guest channel is scheduled for this particular node. In this implementation, the value of b is chosen so that the transmission opportunities of beacon and broadcast packets are reserved (e.g., b=1).

Exemplary Channel Switching Scheduling

We now describe the distributed algorithm for each node 502 to schedule the guest channels to switch. Aspects of scheduling guest channel scheduling at communication links are first generalized in view of a combination of a Maximal Independent Set (MIS) of guest channels and a coloring problem. Then an exemplary distributed implementation of the algorithm is presented in view of the above described exemplary framework based on a tradeoff between signaling overhead and benefits by MIS, for which a greedy algorithm is used.

4. Guest Channel Scheduling to Maximize Throughput

As indicated above, the amount of time that a node 502 remains on the home channel is variable, which is partially overlapped with that of neighboring nodes covering beacon period. The node/station spends the rest of the time in a cycle $T_c$ on guest channel in each cycle. If source and destination nodes 502 of a link switch to the same guest channel at the same time, then the traffic on this link is orthogonal with traffic on the home channel and other guest channels. Since 802.11 provides CSMA/CA (Carrier Sense Multiple Access/Collision Avoidance) to handle contention at the link layer, two way traffic on a link is treated as an atom and scheduled to the same slots in the cycle $T_c$. Thus, channel switching is according to the traffic on a link; a link is bidirectional.

OMMAC 516 guest channel scheduling operations determine which communication link to select, and also determine how long to communicate over respective guest channel(s) to substantially maximize total data throughput (without deterioration). If there is no constraint for the number of channels and the traffic on each link is greedy, and since each 802.11 station involves only one link at a time, OMMAC 516 selects a maximal number of "non-primary conflict" active links. Two links are in "primary conflict" if both links require a same node 502 for communication. A communication link is "active" if there is certain volume of traffic on that link per time cycle $T_c$.

Let V and E denote an entire node 502 and link set (links are shown as respective communication links 532-1 through 532-N) in network 504 respectively, and G denotes an original traffic graph for the network. Assume the total number of nodes in G is N, which are indexed by I=1, 2 ... N, so that we use $V_i$ to denote node i in G. Let $1_{(i,j)}$ denote a bidirectional link 532 between node i and node j, so that we have $1_{(i,j)} = 1_{(i,j)}$. OMMAC 516 converts the original traffic graph G (node graph) for the network 504 into a link graph G', where each node 502 represented in the link graph is an active link in the original node graph. There is a link between two nodes in G' if their corresponding links in G are primary conflict. Thus, the Maximum Independent Set in graph G' corresponds to the non-primary conflict link set in G such that the largest number of links is selected (maximizing throughput).

The Maximum Independent Set problem is well known NP-complete, and thus lots of heuristics algorithms have been proposed to solve MIS (Maximal Independent Set) where no more nodes can be added into it. In this implementation, a MIS in G' corresponds to a link set in G that is maximal and no more links can be scheduled. One well-known heuristic for MIS selection is greedy algorithm, which sorts all the nodes in graph G' by its degree and selects the node with least degree first, removing the selected node and all its neighbor nodes. This least degree node selection continues until all nodes are removed. All selected nodes 502 represent a MIS, and the number of MIS may be more than one if multiple nodes 502 have the same degree.

5. Constraint for the Number of Channels

After a MIS has been generated, OMMAC 516 addresses the constraint of number of channels by coloring. Specifically, OMMAC 516 converts the MIS in link graph G' into a graph G", where each node in G" is a node in the MIS of G', and there is a link between the two nodes in G" if the two corresponding links in G are "secondary conflict." Here, in the original channel graph G, two links are secondary conflict when the two links cannot work in parallel on the same channel at the same time. Therefore, if two links are primary conflict, they must be secondary conflict also, but not vise versa. The graph G" is called channel graph and the coloring algorithm is utilized to schedule the channel for the nodes 502 represented in G". OMMAC 516 selects the MIS of G" and assigns the first represented guest channel to these nodes in MIS. OMMAC 516 then removes the nodes from G" and the used guest channel in guest channel set.

OMMAC 516 continues MIS selection and channel assignment until all nodes 502 are assigned or until the guest channel set is empty. In this implementation, the last MIS is assigned to the home channel since it is also orthogonal to all guest channels. As described above, links are assigned to different guest channels to improve performance. Since channel switching introduces some switching latencies, and to reduce such latencies, a set of links may be configured to stay on the home channel, since the home channel is also orthogonal to all guest channels. In view of this, and in the centralized algorithm, the MIS selected to work on home channel could be any MIS, e.g., the first MIS. However, to break a deadlock in the distributed scenario, the last MIS is selected. Such a deadlock may occur, for example, if multiple nodes/links simultaneously regard themselves as the one's working over the home channel and no guest channel is used.

Figure 4:
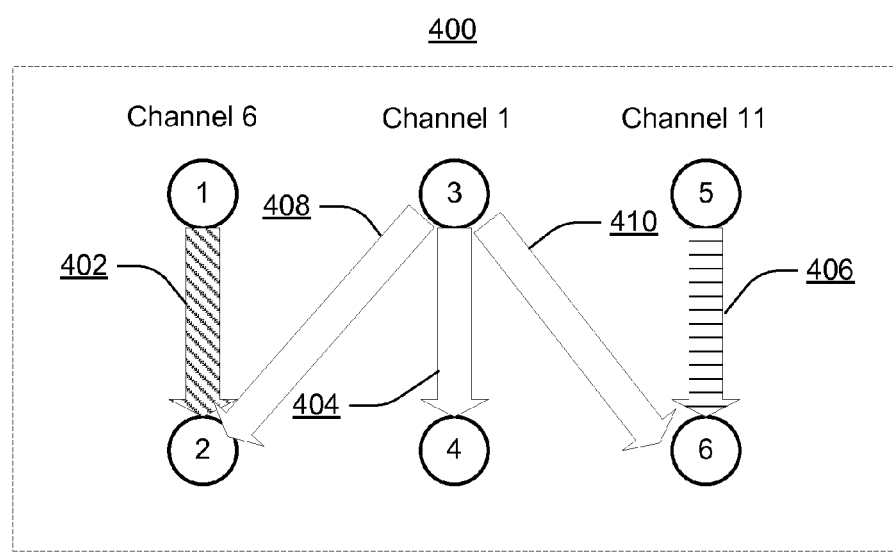
FIG. 4 shows an ad hoc network where some nodes always communicate on a same channel, other nodes communicate across multiple channels, and connectivity between nodes operating on different channels is maintained (essentially a combination of features illustrated by FIGS. 2 and 3).
Figure 7:
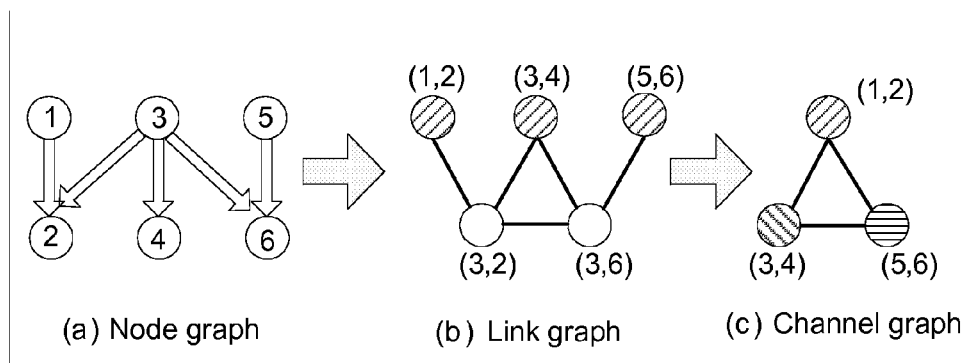
FIG. 7 shows an exemplary set of node, link and channel graphs for distributed overlay multi-channel MAC for ad hoc networks, according to one embodiment.

FIG. 7 shows an exemplary set of node, link and channel graphs for distributed overlay multi-channel MAC for ad hoc networks, according to one embodiment. In this example, FIG. 7(a) shows a network topology and traffic pattern, which for purposes of exemplary illustration is the same as the example in FIG. 4. The five active links in this node graph are converted into the link graph of FIG. 7(b). OMMAC 516 selects the MIS based on the greedy algorithm described above: select the node with least degree first. In the example of FIG. 7(b), the MIS is unique and OMMAC 516 selects the nodes in MIS (links (1,2), (3,4) and (5,6)). OMMAC 516 converts the link graph into exemplary channel graph of FIG. 7(c). Since all the six nodes in the node graph are in the communication range of one another, all the links conflict. Thus, only one link can work at any time. Accordingly, in the channel graph in FIG. 7(c), all the three nodes are connected, so two guest channels (6 and 11) are utilized along with home channel 1. Channels 1/6/11 can be used for the three links respectively (e.g., please refer to FIG. 4).

6. Overhead of Channel Switching

Figure 3:
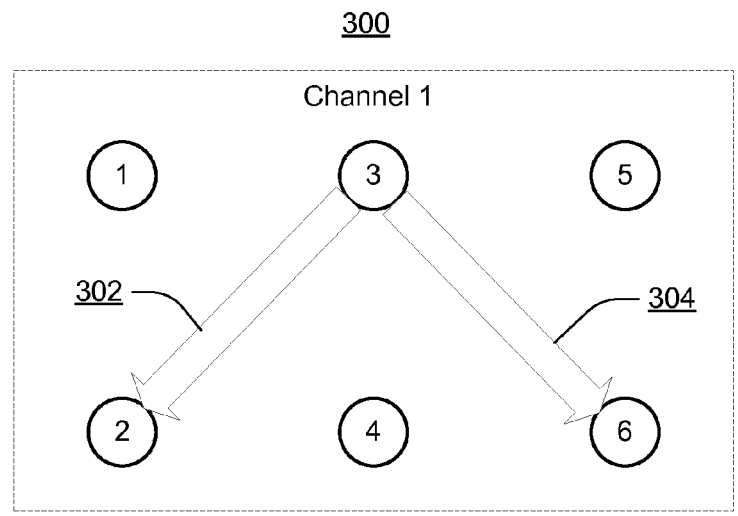
FIG. 3 shows an ad hoc network where nodes to communicate on a respective channel frequency while maintaining connectivity to nodes configured to transmit over different channels.
Figure 8:
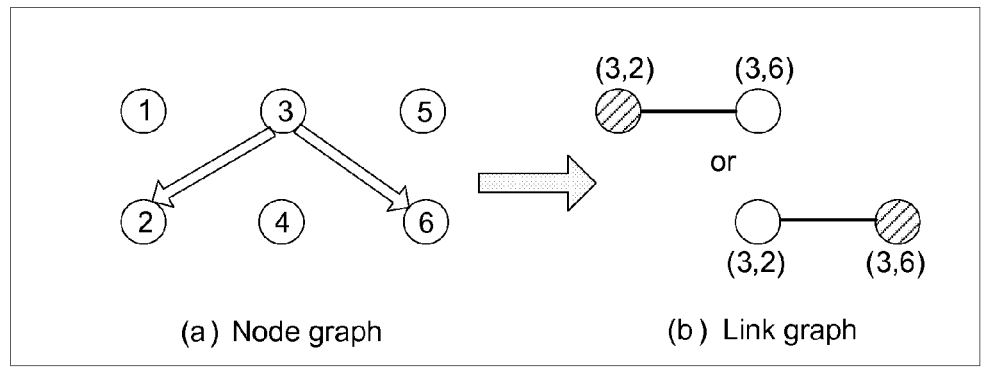
FIG. 8 shows an exemplary node graph converted to a link graph that shows a data throughput bottleneck at a particular network node, according to one embodiment.

For each node 502, OMMAC 516 locally addresses the overhead introduced by channel switching and determines whether the node 502 is a data throughput bottleneck in network 504. Specifically, let $T_{sc}$ and $T_{Ni}$ denote the time overhead of switching channel and the channel occupied time of node $N_i$ per cycle, then channel switching affects the throughput in node $N_i$ if $T_{sc}+T_{Ni}>T_c$. FIG. 8 shows an exemplary node graph (a) converted to a link graph (b) that shows a data throughput bottleneck at a particular network node 502, according to one embodiment. Specifically, FIG. 8 illustrates a situation where data throughput cannot be increased, but rather, data throughput somehow decreased due to the overhead of channel switching. (FIG. 3 is illustrative of a similar scenario). For example, referring to FIG. 3, please note that all nodes are on the same channel, so there is no cost for channel switching. Referring to FIG. 8(*b*), the link graph shows that there is only one node in the corresponding MIS, either link (3, 2) or link (3, 6). If MIS=link (3,2) is chosen to work on a guest channel, then there is certain overhead at node 3. However, both link (3,2) and (3,6) require node 3 to be involved. Therefore, total throughput is decreased if node 3 is implementing channel-switching operations. Please note that with one link scheduled, data throughput cannot be increased. In such a scenario, OMMAC 516 removes the channel-switching scheduling for the node 502.

7. Pole Point Decisions

The preceding paragraphs have described how OMMAC 516 establishes when a communication link is scheduled on a particular channel. We now describe how OMMAC 516 determines a pole point for a nodes' channel switching operations. For node $N_i$, $T_{Ni}$, total channel occupation time consists of both transmission time and receiving time on all channels. For a link $l_{(i,j)}$, let $T_{(i,j)}$ denote the channel occupation time on all channels. We have $$T_{Ni}=\Sigma T_{(i,j)}, \forall T_{(i,j)}>0. \quad (2)$$

The time weight of link $l_{(i,j)}$ on node $N_i$ is:

$$w_{N_i}^{(i,j)}=T_{(i,j)}/T_{Ni}. \quad (3)$$

Thus, we define the time weight of link $l_{(i,j)}$ as $$w^{(i,j)}=\min(w_{N_i}^{(i,j)}, w_{N_j}^{(i,j)}). \quad (4)$$

For link $l_{(i,j)}$, the pole point is scheduled so that $$T_g^{(i,j)}=w^{(i,j)}T_c. \quad (5)$$

The time to select a guest channel according to equation (5) guarantees that: (a) time on guest channel is adjusted according to traffic volume on that link, so that more time is allocated if traffic increases; and (b) the proportional to cycle time ensures the goal that the requirement of other traffic on the corresponding node 502 is not affected.

In one implementation, for example, OMMAC 516 implements a centralized algorithm to schedule channel switching, for each node 502. The centralized algorithm always provides complete and updated information for ad hoc network traffic and nodes, while a distributed algorithm provides localized such information. Centralized algorithm MIS selection may have multiple solutions, whereas only one MIS solution will be selected. In contrast, using a distributed algorithm, results are determined by multiple steps taken at neighbor nodes. This means that using the distributed algorithm, each node's decision affects the entire result, but does not control the entire result. For instance, compared with the centralized algorithm, the steps taken in such a distributed algorithm are asynchronous, and could be parallel, conflict, or even result in a deadlock scenario. (This latter scenario, as described above, is addressed by using the home channel for the last MIS and a channel negotiation protocol).

In this implementation, for example, the centralized algorithm to schedule channel switching, for each node 502, is as follows:
(a) Evaluate the channel occupied time for a node 502 and remove the node $N_i$ if $T_{cs}+T_{Ni}>T_c$; the resulting node graph is G.
(b) Covert node graph G to link graph G' and select a MIS from G' using the greedy algorithm, as described above.
(c) Covert the link graph G' to a channel graph G" and select the MIS from G" and assign guest channels until G" or guest channel is empty,
(d) Schedule the channel switching pole point according to the time weight of the link.

An Exemplary Distributed Algorithm for Channel Switching

OMMAC 516 is designed in view of the following: 1) each node 502 has only partial updated information of network 504, so OMMAC 516 locally optimizes the channel switching decision in view of information acquired from one-hop neighbor nodes 502 (this decision is independent of information from nodes further than a one-hop range); 2) each link is scheduled on a guest channel asynchronously, so in centralized mode OMMAC 516 link scheduling is adjusted in view of other scheduled links; and 3) OMMAC 516 implements a protocol for guest channel negotiation for distributed channel switching and adapts to traffic. These aspects are described in greater detail below.

8. Local MIS

Each node 502 in a wireless network 504 typically only obtains information of traffic and channel in its communication range. Thus, the network traffic graph G generated/observed by each node is partial. Accordingly, MIS selection on each node 502 may be different. In this subsection, we discuss updating a node's information with information from neighbor node(s) 502. Specifically, OMMAC framework 516 provides for link layer broadcast over the home channel. As such, each node 502 is configured to communicate periodic broadcast messages to exchange traffic and channel information with other node(s) 502. In this implementation, for example, each node 502 communicates such a broadcast message once per second, although other periodic time frames could be used. To reduce opportunities for delayed messages, possibly resulting in outdated information, each node 502 broadcasts its traffic and channel information rather than relaying information for other nodes. In another implementation, such information exchange is implemented independent of broadcast messages. For example, in one implementation, a node's traffic and channel information is piggy-backed in an ongoing traffic header.

9. Asynchronous Channel Switching Scheduling

In centralized mode, OMMAC 516 calculates a MIS for the whole link graph of network 504. OMMAC 516 then assigns all the links using a greedy algorithm (least degree first). The greedy (least degree first) algorithm is an example of a known coloring algorithm. In practical distributed mode, each node 502 negotiates channel switching scheduling asynchronously, which means a node 502 makes schedule decision based on observed channel-switching schedule(s) received from neighbor node(s) 502. Such asynchronous scheduling smoothes any message surge over network 504 by negotiation messages, and balances data throughput load on home channel time. In one implementation, and to further reduce overhead of negotiation messages, OMMAC 516 generates channel-switching schedule(s) that cover channel-switching activities for multiple time cycles (e.g., please see FIG. 6).

In one implementation, OMMAC 516 implements a distributed algorithm for node $N_i$ to schedule channel-switching pattern as follows.

- A node 502 periodically broadcasts associated occupation time $T_{Ni}$, time weight and channel of any active link on the node 502.
- The node 502 collects broadcast message(s) received from neighbor node(s) 502 to construct a graph G representing all two hop neighbor nodes and active links. For instance, two-hop node information is obtained by evaluating broadcast messages from one-hop nodes. To illustrate this, please assume there is a chain topology with five nodes, from node A to E as follows: A - - - B - - - C - - - D - - - E. In this example, node A can only hear B, B can hear A and C, . . . E can only hear D. Node C receives broadcasts from node D, which contains traffic information associated with D→C and D→E. So node C knows there is a node E, and E is not C's neighbor since C cannot hear E directly. Similarly, C knows A. In this manner, each node can collect information from all nodes within two hops.
- The node 502 evaluates the channel occupied time for each neighbor node 502; removing a neighbor node $N_j$ from G if $T_{cs}+T_{Nj}>T_c$.
- The node 502 converts node graph G to a link graph G'. Then the node 502 evaluates the link graph to check the schedule of all active links, moving a node to MIS if the corresponding link has been scheduled. The node 502 continues to identify node(s) in MIS from G' using a greedy algorithm.
- The node 502 converts the link graph G' to a channel graph G", selects MIS from G", as described above, and assigns guest channel(s) based on scheduled link channel setting until G" or guest channel sets are empty.
- If a link $l_{(i,j)}$ is in G" and not scheduled, the node 502 schedules the channel switching pole point according to the time weight of the link (please see equation (3)).

10. Exemplary Protocol for Schedule Negotiation

Figure 9:
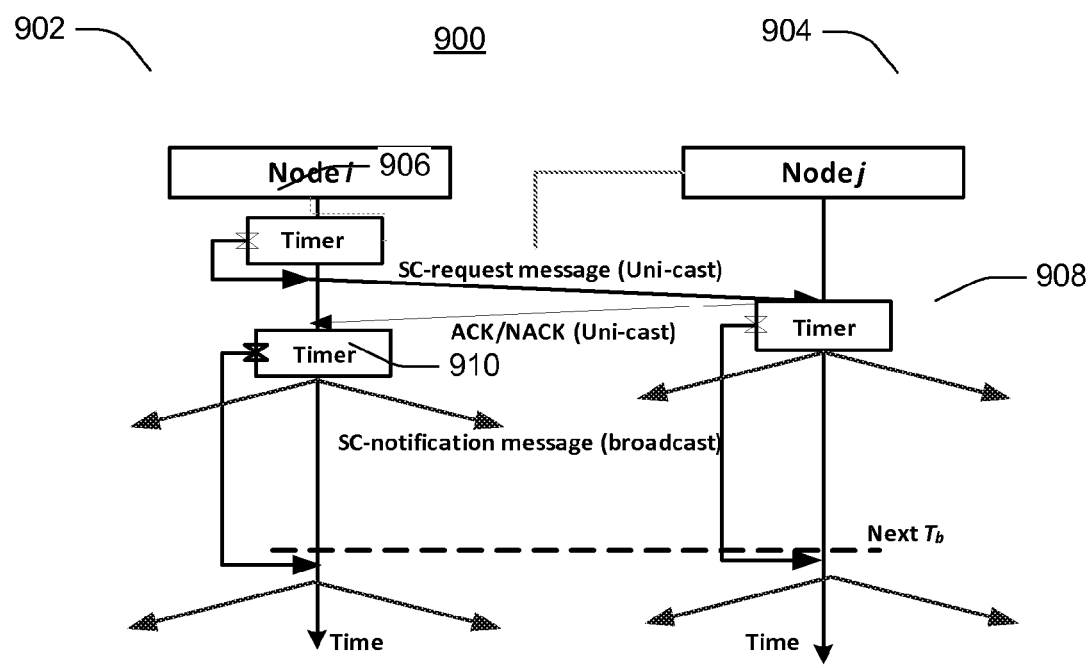
FIG. 9 shows an exemplary channel switching scheduling negotiation protocol implementation, according to one embodiment.

FIG. 9 shows an exemplary channel switching scheduling negotiation protocol implementation, according to one embodiment. In this example, each node $N_i$ and $N_j$ represents a respective node 502 of FIG. 5. Referring to FIG. 9, and based on the above described distributed algorithm, if node $N_i$ 902 decides to schedule channel switching with a neighbor $N_j$ 904, $N_i$ sends a Switch Channel (SC) request message to node $N_j$ to indicate that it wishes to schedule channel switching with $N_j$. (For purposes of exemplary illustration, such a SC request message is shown as a respective portion of "other program data" 538 in FIG. 5). In this implementation, the SC-request message includes a proposed pole point and guest channel.

Referring to blocks 906, 908, and 910, and in this implementation, respective message sending and receiving nodes start respective timer(s) responsive to sending/receiving message(s) to avoid synchronized channel switching schedule negotiation for nodes in a neighborhood of nodes 502. (Exemplary timer logic 528 is described in greater detail below in the section titled "Timer Logic" at paragraph [0062]). Responsive to receiving the request message, node $N_j$ checks whether $T_{sc}+T_{Nj}<T_c$. Please recall that $T_{sc}$ and $T_{Ni}$ respectively denote the time overhead of switching channel and the channel occupied time of node $N_i$ per cycle; channel switching affects the throughput in node $N_i$ if $T_{sc}+T_{Ni}>T_c$. If passed (i.e., $T_{sc}+T_{Nj}<T_c$), $N_j$ verifies whether the proposed guest channel is already reserved by any one-hop neighbor node(s) 502. If the proposed guest channel is not already reserved, $N_j$ confirms the request with an acknowledgement (ACK) message (uni-cast) to node $N_i$. In this scenario, a scheduled channel switching action at the proposed pole point is performed by both $N_i$ and $N_j$ per cycle. In the alternative, $N_j$; send to the requesting node a non-acknowledgement (NACK) message to deny and cancel the channel switching request. In this implementation, node $N_j$ notifies $N_i$ of reason(s) for rejecting such a request. If the reason for rejecting the channel switch request is due to an occupied channel, $N_j$ piggybacks a different suggested candidate guest channel to node $N_i$, if possible.

In one implementation, a node 502 may provide feedback to other node(s) 502, for example, with ACK/NACK messages to confirm/reject the switching request. If the result is NACK or no feedback is received at node $N_i$ after a configurable amount of time has passed (a timeout), then node $N_i$ regards the channel switching request as a failed request. Otherwise, in this implementation, both nodes $N_i$ and node $N_j$ broadcast a SC-notification message twice: a first such message is broadcast right after the SC-response message is sent or received at node $N_j$ or $N_i$ respectively. In this implementation, such double notification substantially prevents any impact of a notification broadcast being lost. If nodes implement the channel switching negotiation on broadcast channel time in a current time cycle, the second SC-notification message is communicated at the broadcast time in a next time cycle. This latter scenario is shown in FIG. 9. Please note that in this implementation, it is possible that two nodes 502 will negotiate a new switching schedule, for example, due to pole point changes or schedule extending on a previously scheduled guest channel. In such a scenario, and in this particular implementation, local OMMAC(s) 516 respectively schedule the two broadcasts based on a broadcast time in next and third cycles, respectively.

An Exemplary Network Node Design

Figure 1:
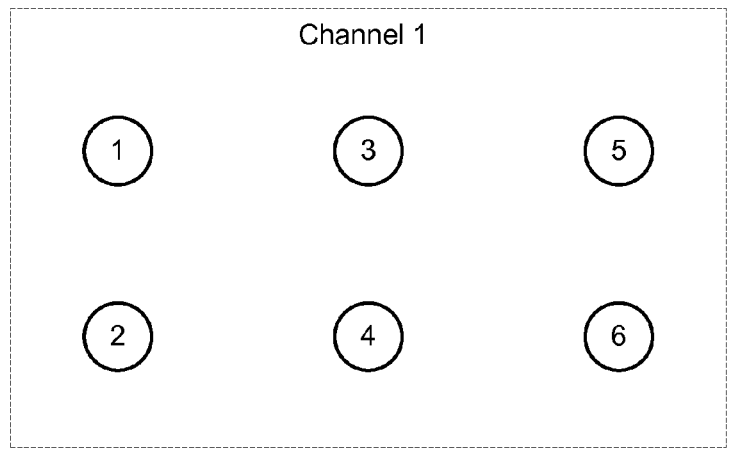
FIG. 1 shows an ad hoc network including of computing device network nodes.
Figure 2:
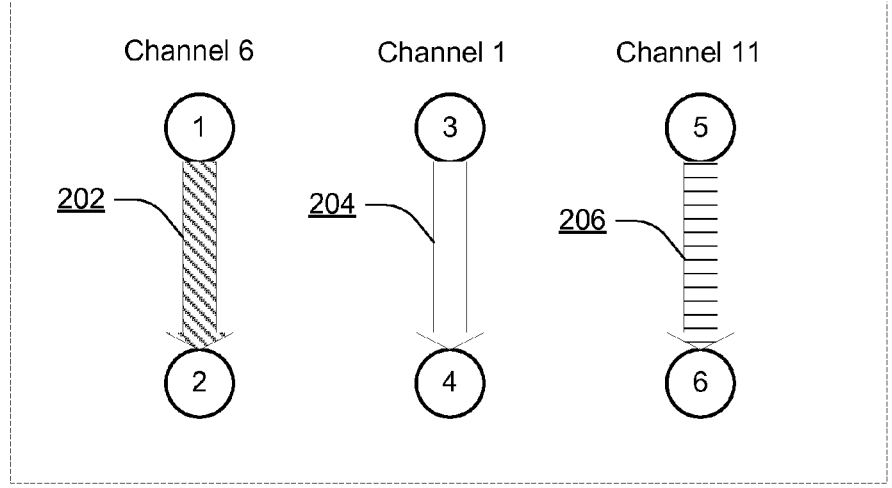
FIG. 2 shows an ad hoc network with node-pairs communicating on different orthogonal channels to reduce mutual transmission interference.

Referring to FIG. 1, as discussed above, each node 502 implements a respective portion of the channel switching policy of system 500. In one implementation, this channel switching policy is centralized. In another implementation, this channel switching policy is distributed. Specifically, OMMAC 516 includes logic to control NIC driver 518, manage operating system non-real-time software interrupts, and comply with any legacy NIC driver scheduling/buffering requirements. For example, in one implementation, OMMAC 516 includes traffic measurement logic 522, information exchange logic 524, channel switching scheduler logic 526 ("scheduling on switching logic" 526), timer logic 528, and packet buffering logic 530. This exemplary ordering does not imply or limit architectural order or dataflow between various portions of this logic. Rather, the presented order of logic 522 through 530 is for purposes of description. The exemplary aspects of these modules are now described.

Exemplary Traffic Measurement and Information Exchange

Traffic measurement logic 522, for example, generates log(s) of sent and received packets. Traffic measurement logic 522 also calculates associated traffic volume for incoming and outgoing packets. In this implementation, traffic measured at logic 522 implements such calculations using a known time sliding window average algorithm to provide an averaged traffic volume for a previous configurable time-period. Information exchange logic 524 propagates channel-switching schedules for the corresponding node 502. For purposes of exemplary illustration, such logs and channel switching schedules are shown as respective portion of "other program data" 538. Information exchange logic 524 also organizes traffic information and channel-switching schedules received from neighboring nodes 502. Scheduling and switching logic 526 utilizes any such received channel-switching schedules to implement exemplary channel switching scheduling operations.

Exemplary Scheduling and Switching Logic

Scheduling and switching logic 526 performs, for example, the greedy algorithm described above based on the node-specific information (self-information) collected by traffic measurement logic 522 and neighbor-node 502 information collected by information exchange logic 524. Scheduling and switching logic 526 also accesses/utilizes Application Programming Interface (API) 534 Exposed by the NIC Driver 518. API 534 provides an interface into the NIC driver 518 to switch channels and synchronize channel switching schedules so that respective ones of the nodes 502 switch to a same channel at a same time. We now describe an exemplary implementation of node channel switching synchronization.

Synchronizing channel-switching operations between nodes across multiple channels is challenging since nodes working on different channels are more likely to lose synchronization. Using conventional channel switching techniques, a difference in channel switching times between network-nodes often results packet retransmissions, and may even result in packet loss. Multiple factors affect channel-switching synchronization. Such factors include, for example, the particular synchronization protocol utilized, clock drift, temperature, etc. Scheduling and switching logic 526 addresses these challenges with a practical node channel-switching synchronization scheme that allows nodes 502 to switch to a particular channel frequency at the same time.

In this implementation, scheduling and switching logic 526 operates on a periodic time cycle that is based on the 802.11 superframe. (Please also refer to the above description associated with FIG. 6 describing such a periodic time cycle). The 802.11 protocol beacons at the beginning of broadcast message periods. A received beacon indicates an 802.11 MAC time. Responsive to receiving a beacon, each node 502 updates its respective 802.11 timestamp (i.e., at the broadcast time for each cycle). Each node 502 then determines any difference of the local machine time and the MAC time per cycle. When scheduling and switching logic 526 calculates a channel-switching schedule for a node 502, the scheduling and switching logic 526 translates times associated with the schedule into the 802.11 MAC time. Such translations are performed before any communication by information exchange logic 524 of the schedule to neighbor-node(s) 502. Responsive to receiving such channel-switching schedule(s) from other node(s) 502, scheduling and switching logic 526 translates the indicated 802.11 MAC time(s) to associated local machine time to schedule the channel-switching event.

In this implementation, NIC driver 518 exposes API 534 allowing switching logic 526 to request NIC driver 518 to send the requesting node 502 the MAC time (e.g., 802.11 MAC time). This respective portion of API 534 allows a requesting node 502 to calculate the difference of machine time and MAC time. In this implementation, granularity of MAC time is 1 microsecond, and synchronization error of MAC time is the propagation delay error of approximately 1 also microsecond. Machine time granularity, for example, is typically 100 nanoseconds. Therefore, and in this particular implementation, switching logic 526 provides node channel switching synchronization at a microsecond level.

Moreover, because each node 502 operates over a same home channel and 802.11 MAC broadcasts beacons only on the home channel, when a new node is added to network 504, the new node uses the 802.11 scan phase to implement network discovery operations.

Timer Logic

For purposes of exemplary description, timer aspects of the WINDOWS operating system are described. These described aspects are analogous to other operating system implementations. The default timer granularity on WINDOWS is 10 ms and an application can typically obtain accurate time measurements at 100 ns. For stringent timer requirements in a kernel, WINDOWS provides an API to adjust timer granularity to approximately 1 ms. However, after adjusting timer granularity, and although average timer error is less than 1 ms, timer error can still be greater than 10 ms when operating system (OS) load is very high. One reason for this is because software and hardware events are typically placed into priority-based queues for processing. Hardware events typically have the highest priority for removal from the event queue for processing, whereas software events have many possible priorities. Thus, there are practical limitations of implementing a channel-switching schedule using a software timer based on operating system timer interrupts.

In contrast to conventional channel-switching timers, OMMAC 516 implements software timer logic 528 timer based on multiprocessing time slices associated with the operating system. Timer logic 528 of system 500 addresses the limitations of conventional software timers to provide timers for packet and channel-switching scheduling. Specifically, timer logic 528 sets priority of timer-threads to a highest software priority level so that they will be promptly removed from the event queue and processed. Such priority level adjustments substantially reduce channel switching latencies evident in conventional channel-switching implementations. For packet and channel switching scheduling, timer logic 528, responsive to expiration/firing of a timer-thread for a packet schedule, notifies packet buffering logic 530 to send packets to specific neighbor-nodes 502. (Such buffering logic is described in the following section titled "Exemplary Packet Buffering Logic"). In another example, when a channel switch timer fires, timer logic 528 notifies switching logic 526 to communicate a channel switch command/request to NIC driver 518 (e.g., via API 534)a.

Exemplary Data Flow

Figure 10:
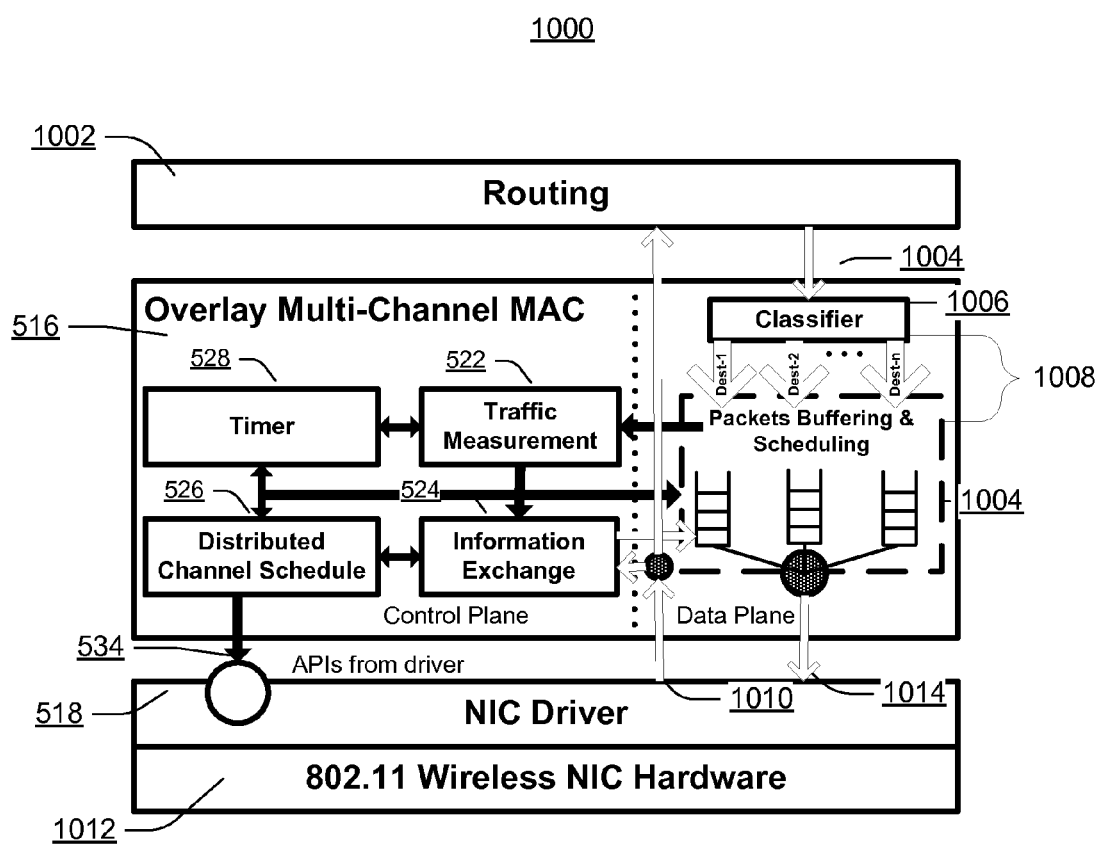
FIG. 10 shows an exemplary packet buffering and scheduling node architecture for distributed overlay multi-channel MAC for ad hoc networks, according to one embodiment.

FIG. 10 shows another exemplary node architecture for distributed OMMAC for ad hoc networks, according to one embodiment. Specifically, FIG. 10 shows exemplary data flow between packet routing logic, data and control plane portions of the OMMAC 516, and NIC driver 518. The data plane represents packet buffering logic. Such packet buffering logic is shown in FIG. 5 as packet buffering logic 530. The control plane includes traffic measurement logic 522, information exchange logic 524, distributed general scheduling and switching logic 526, and timer logic 528 as described above with respect to FIG. 5. Thus, and for purposes of exemplary description, aspects of FIG. 10 are described with respect to components of FIG. 5. In this description, when a left-most numeral of a component reference number begins with a "5", the component was first introduced in FIG. 5.

Referring to FIG. 10, OMMAC 516 comprises a data plane and a control plane. The data plane receives packets from conventional packet routing logic 1002, as shown by data traffic arrow 1004. The data plane also receives messages (e.g., negotiation messages, signaling messages, etc.) from the control plane portion of OMMAC 516. (Messages from the control plane are represented with a black (filled-in) arrow that trends from left to right from the control plane to the data plane). As shown, data plane classifier logic 1006 puts received packets/messages (collectively referred to as packets) into node destination queues 1008 based on packet destination and based on whether the packet is to be communicated over the home channel or a particular guest channel. Such destination queues are illustrated in FIG. 10, for example, as "Dest-1" through "Dest-n." Node destination and channel identification are provided by respective packet headers. Arrow 1010 represents incoming (uplink) messages from NIC driver 518 (the interface to NIC hardware 1012). As shown, OMMAC 516 transfers incoming messages representing data to routing logic 1002. OMMAC 516 transfers incoming messages that are not data to the control plane.

As indicated in the previous sections, a network node's local OMMAC 516 includes timer logic 528 to trigger pole point(s) for the corresponding node to switch from the home channel to a corresponding guest channel during a periodic time cycle (at the end of which the node switches back to the home channel). A nodes' pole point is based on the node's traffic provided by traffic measurements of traffic measurement logic 522, as well as traffic measurements provided by other nodes. To this end, this node exchanges its particular traffic measurements with other nodes so that the other nodes can make their own pole point decisions. In the example FIG. 10, the left-to-right arrow from the control plane to the data plane represents data traffic, at least a portion of which is this particular node' traffic measurements for queuing and communication to other respective nodes in the ad hoc network. Such communication is shown by arrow 1014. Additionally, and as described in the previous sections, distributed channel schedule logic 526 schedules channel switching times (e.g., based on the greedy algorithm) for this node and communicates these schedules to other nodes for channel switching synchronization operations.

Exemplary Packet Buffering Logic

We now describe operations of the data plane of FIG. 10 (also represented by packet buffering logic 530 of FIG. 5) in greater detail. The packet buffering logic buffers packets from classifier logic 1006 and from the control plane for packet transmissions to other network nodes in the ad hoc network. In this implementation, buffering logic 530 buffers packets in priority-sorted destination queues 1004. (Such priority-sorting is not a first-in first-out priority sorting, but rather based on specific priorities provided by one or more respective portions of OMMAC 516 (e.g., timer logic 528) and/or other program modules). For example, in a priority queue, OMMAC 516 provides signaling messages, such as the channel-switching request(s) described above, with higher respective priorities than messages associated with other application traffic.

In this implementation, for example, each node 502 implements a per-node-neighbor destination queue 1006 to control transmission of packets to different destination node(s) scheduled at different time(s). If multiple neighbor-node queues 1006 are active (e.g., an active queue exhibits a threshold amount of traffic) and valid for the same time (e.g., on the home channel), the packets are served according to a round-robin order. As shown, the packet buffering and scheduling logic maintains the priority queue, not NIC driver 118 or corresponding hardware 1012. This allows switching and scheduling logic 526 to control all packet transmission times as corresponding channels are scheduled.

Serving packets according to a round-robin order is different from serving packets according to first-in first-out (FIFO) scheduling. This is because a node 502 buffers packets according to respective priorities in different queues. A queue with higher priority is always served first then a queue with a lower priority. Queues with a same priority are served by round-robin scheduling. For FIFO, packets are served according to arrival time. In contrast, and in this implementation, higher priority packet(s) are served from a queue even if the higher priority packet(s) arrive later than packets queued in lower priority. Round-robin operations are also different than FIFO queue handling operations. For instance, please assume queue1 and queue2 has some priority, and queue1's packet arrival rate is twice of queue2's. With FIFO, queue1 is given twice opportunities than queue2, while with round-robin, queue1 is given the same opportunity as queue2.

When conventional channel switching schemes switch channels, packets buffered by the MAC or in hardware are typically dropped because of hardware reset(s) occurring at a switching channel. Additionally, MAC or hardware buffer space allocated to data throughput performance is generally limited in size, often resulting in buffer overflow conditions. To address such limitations of conventional systems, the packet buffering and scheduling logic sends packets to NIC driver 518 only when a previously communicated packet has been served by NIC driver 518. To provide this determination, NIC driver 518 communicates a success status (please see uplink arrow 1010) to information exchange module 524. Information exchange model 524 then communicates the status to the packet buffering and scheduling logic. In such a scenario, and when a previous packet is pending at the NIC driver 518, the packet buffering and scheduling logic holds on to any next packet until such a success status is received. Additionally, in this implementation, switching and scheduling logic 526 uses timer logic 528 to configure a packet drain-time before any scheduled channel-switching event. This packet drain-time provides the wireless NIC hardware 1008 with time to communicate any buffered packets prior to the channel switching operations. In this implementation, the packet drain time is 1 ms.

An Exemplary Implementation

Figure 11:
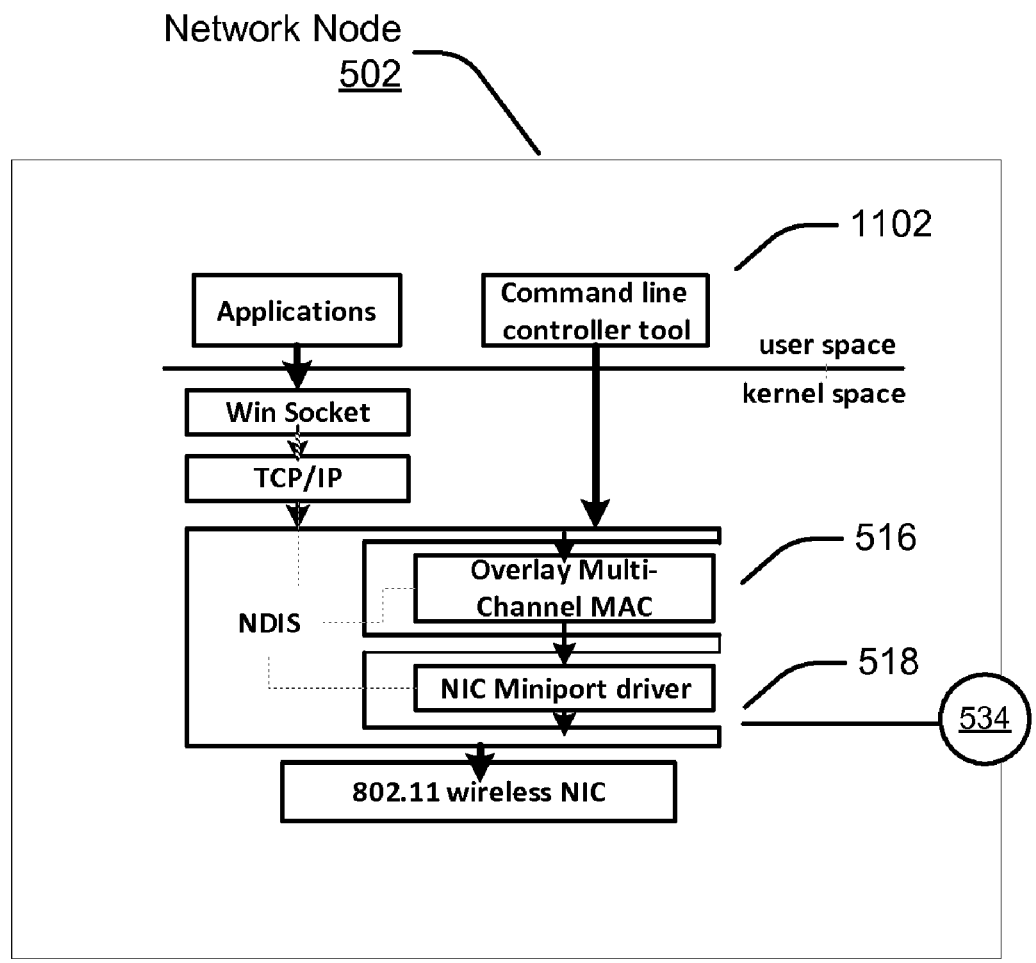
FIG. 11 shows exemplary implementation for a network node implementing distributed OMMAC for ad hoc networks, according to one embodiment.

FIG. 11 shows exemplary implementation 1100 for a network node implementing distributed OMMAC for ad hoc networks, according to one embodiment. This particular example shows a node 502 (please also see FIG. 5) with a local OMMAC 516 implemented on a WINDOWS platform. This representation is for exemplary purposes only, being only one sample platform out of many possible platforms for implementing the local OMMAC 516. For example, the node's local OMMAC could also be implemented on a Linux platform, a UNIX platform, etc. Referring to FIG. 11, stack modules of this implementation are shown in FIG. 11 with a light shadow fill. For example, OMMAC 516 is implemented as an IM (Inter-media) NDIS (Network Driver Interface Specification) driver on WINDOWS XP platform. NIC miniport driver 518 (please also see FIG. 5) provides: (a) an interface 534 (please also see FIG. 5) providing an 802.11 MAC time (synchronized by beacons for all nodes 502 in the 802.11 ad hoc network); (b) an interface 534 to receive and respond to requests for channel switching at NIC driver; and (c) etc. Command line tool 1102 provides a user interface to control behavior of OMMAC 516. Such behavior includes, for example, changing parameters such as cycle time, slot size, guard time of switching channel, and/or so on. This example also illustrates "Applications" running in user space communicating with "Win Socket", "TCP/IP" and "NDIS" in kernel space to communicate with a wireless NIC. Again, this is only one exemplary implementation of a network node to implement systems and methods for distributed overlay multi-channel MAC for ad hoc networks.

Exemplary Procedure

Figure 12:
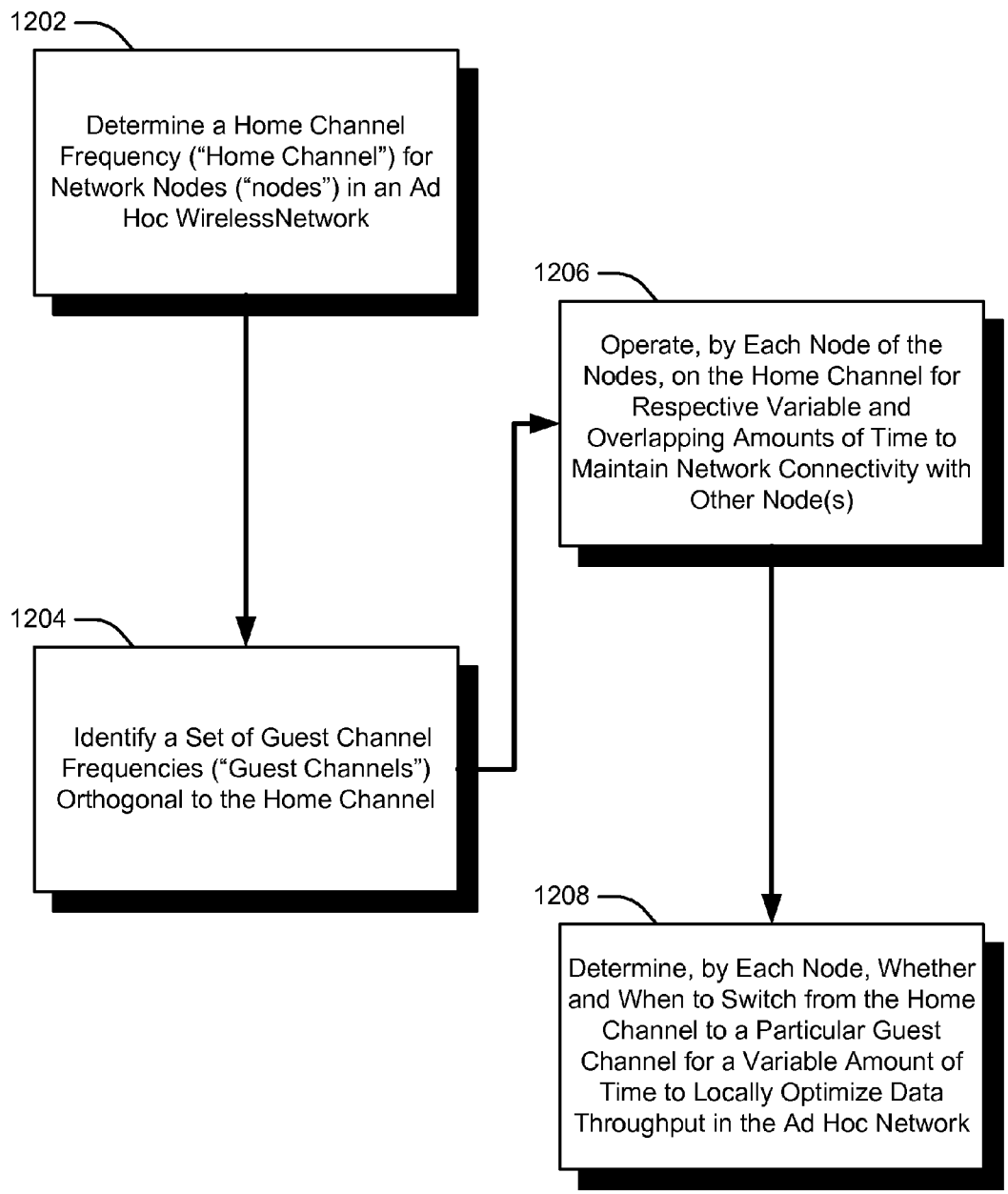
FIG. 12 shows an exemplary procedure for distributed overlay multi-channel MAC for ad hoc networks, according to one embodiment.

FIG. 12 shows an exemplary procedure 1200 for distributed overlay multi-channel MAC for wireless networks, according to one implementation. In one implementation, operations of procedure 1200 are implemented by respective program modules 510 of a network node 502 of FIG. 5. For purposes of exemplary illustration and description, the operations of procedure 1200 are described with respect to the components and various aspects of FIGS. 5 through 11. In this description, the left-most numeral of a component/operation (step) reference number ranging from 100 to 999 represents the figure in which the component/operation was first introduced. Analogously, the two-left-most numerals of a component/operation reference numeral ranging from 1000 and greater represents the figure in which the component/operation was first introduced.

Referring to FIG. 12, operations of block 1202 determine a home channel frequency ("home channel") for network nodes in an ad hoc wireless network. Operations of block 1204 identify a set of guest channel frequencies ("guest channels") orthogonal to the home channel. The home and guest channels are selected (i.e., determined and identified) from multiple channel frequencies provided by a wireless network protocol. Such a wireless network protocol includes, for example, IEEE 802.11. Operations of block 1206 operate, by each node in the ad hoc wireless network, over the home channel for respective variable and overlapping amounts of time to maintain network connectivity with other network nodes. Operations of block 1208 determine, by each node, whether and when to switch from the home channel to a respective assigned guest channel for variable amount of time to locally optimize data throughput in the ad hoc network.

Figure 13:
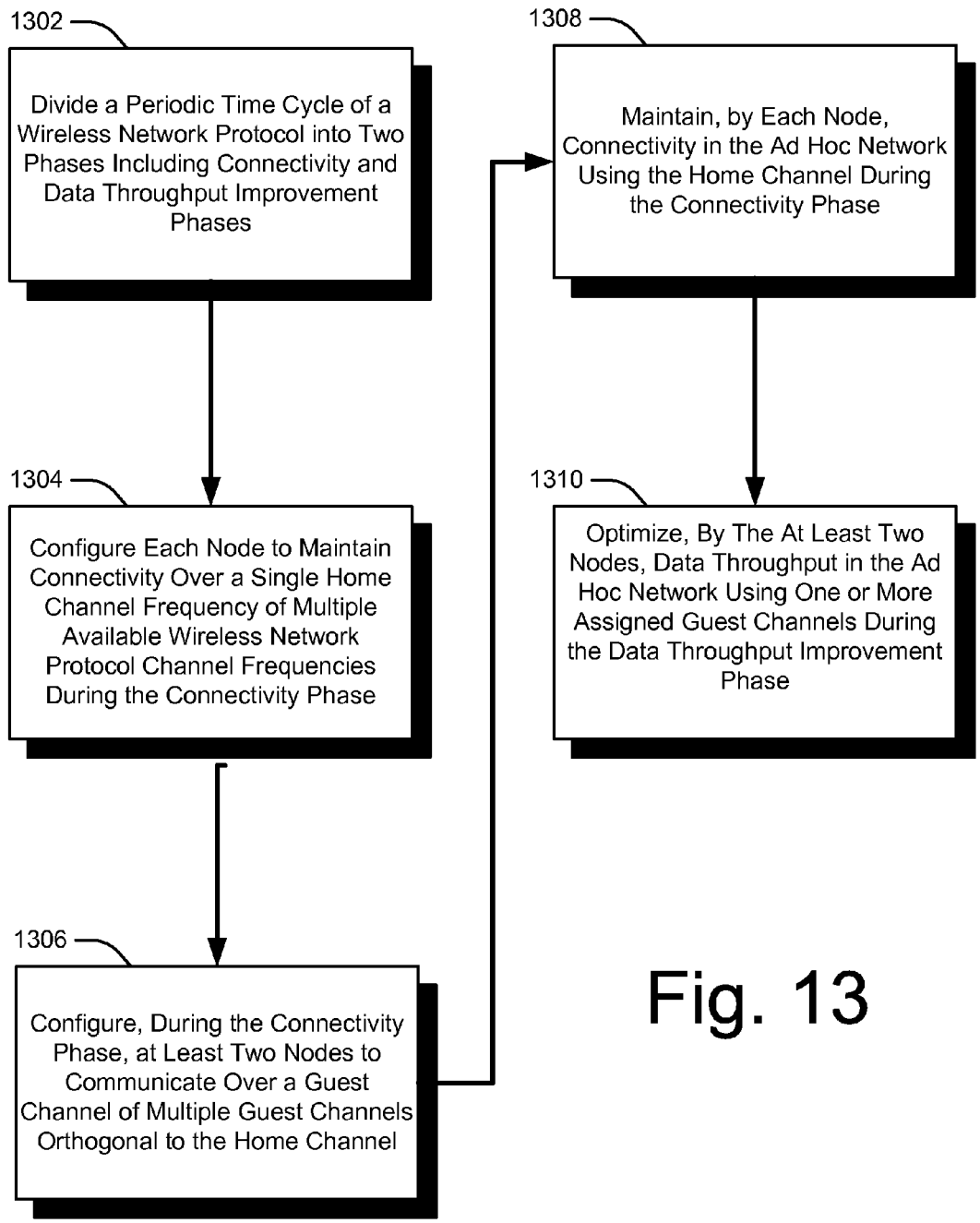
FIG. 13 shows another exemplary procedure for distributed overlay multi-channel MAC for ad hoc networks, according to one embodiment.

FIG. 13 shows another exemplary procedure for distributed overlay multi-channel MAC for ad hoc networks, according to one embodiment. Operations of block 1302 divide a periodic time cycle of a wireless network protocol into two phases. The two phases include a node connectivity phase and a data throughput improvement phase. The periodic time cycle is associated with a periodic beacon message communicated by respective ones of the network nodes according to the wireless network protocol. In one implementation, the wireless network protocol is based on the IEEE 802.11 wireless network protocol.

Operations of block 1304 configure each network node in the ad hoc network to maintain connectivity over a single home channel frequency of multiple available channel frequencies during the connectivity phase. The multiple available channel frequencies are provided and according to the wireless network protocol. Operations of block 1306 configure, during the connectivity phase, at least two nodes to communicate over a guest channel of multiple guest channels that are orthogonal to the home channel. Operations of block 1308 maintain, by each network node, connectivity in the ad hoc network between respective notes using the home channel during the connectivity phase. Operations of block 1310 optimize, by least a subset of the network nodes, data throughput in the ad hoc network using one or more respective assigned guest channels during the data throughput improvement phase. In this manner, network nodes in the ad hoc network maintain node-to-node network connectivity and improve performance of the ad hoc network.

CONCLUSION

Although the above sections describe distributed overlay multi-channel MAC for wireless ad hoc networks in language specific to structural features and/or methodological operations or actions, the implementations defined in the appended claims are not necessarily limited to the specific features or actions described. For example, OMMAC 516 (please see FIG. 5) channel switching latency can be reduced by replacing the software timer provided by a non-real-time OS with a hardware timer. Alternatively, in an alternate implementation, timer accuracy is improved by adding real-time support to the OS. Thus, the specific features and operations for distributed overlay multi-channel MAC for wireless ad hoc networks described above are exemplary forms of implementing the claimed subject matter.

The invention claimed is:

1. A computer-implemented method in an network of interconnected network nodes, the method comprising:

dividing a periodic time cycle into two phases, the periodic time cycle being associated with a beacon time of a network protocol, the two phases comprising a connectivity phase and a data throughput improvement phase;

configuring each node of the interconnected network nodes to maintain connectivity over a home channel, the home channel being a single channel frequency, and one of multiple available channel frequencies during the connectivity phase, the available channel frequencies being established by the wireless network protocol;

configuring at least a subset of the interconnected network nodes to communicate over a particular guest channel of multiple guest channels during the connectivity phase, each guest channel being orthogonal to the home channel, the configuring comprising:

determining a node traffic graph to represent data traffic patterns for nodes in the network;

converting the node traffic graph into a link graph, the link graph representing communication links between active nodes represented by the traffic graph, each active node being associated with a threshold amount of data traffic;

identifying a maximum independent set (MIS) of one or more nodes from the link graph, each of the one or more MIS nodes being a node that is not in primary conflict with another node, a node being in primary conflict with another node when the node and the other node require a same node for data communication;

translating the link graph into a channel graph, the channel graph representing the guest channels; and if there are at least two nodes represented in the MIS of nodes, for each node in the MIS of nodes, assigning the node to a respective guest channel of the guest channels represented in the channel graph;

maintaining, by each node, connectivity in the network using the home channel during the connectivity phase; and optimizing, by at least a subset of the nodes, data throughput in the network using one or more guest channels of the guest channels during the data throughput improvement phase.

2. The method of claim 1, wherein the wireless network protocol is based on IEEE 802.11.

3. The method of claim 1, wherein the home channel is a channel frequency of the available channel frequencies with a least amount of noise as compared to noise on other channels of the available channel frequencies.

4. The method of claim 1, wherein configuring each node to maintain connectivity over the home channel further comprises:
- determining respective amounts of time during the periodic time cycle for each node to operate over the home channel;
- calculating a minimum value of the respective amounts of time, the minimum value representing an amount of time where all of the interconnected network nodes are operating over the home channel, the minimum amount of time being a broadcast time period $T_b$,
- broadcasting, by each node in the network, a respective broadcast message to maintain connectivity during $T_b$.

5. The method of claim 1, wherein operations associated with configuring at least the subset to communicate over the particular guest channel are distributed such that each node is configured to communicate of a respective channel of the guest channels based on data throughput and connectivity of one or more one-hop neighbor nodes of the interconnected network nodes.

6. The method of claim 1, wherein if the MIS of interconnected network nodes represents only a single node of the interconnected network nodes, the method further comprises removing any channel-switching schedule associated with the single node.

7. The method of claim 1, wherein the MIS of one or more nodes is determined using a greedy algorithm.

8. The method of claim 1, wherein operations associated with maintaining the connectivity and optimizing the data throughput further comprise:
- for each node during the periodic time cycle:
  - if data throughput between the node and another node can be improved:
    - (a) calculating a channel-switching schedule for the node to switch from the home channel to a particular guest channel at a pole point in the periodic time cycle;
    - (b) communicating the channel-switching schedule to the other node such that the node and the other node can switch to a particular guest channel of the guest channels at a synchronized time; and
    - (c) switching the node from the home channel to the particular guest channel at the synchronized time to transition the node from the connectivity phase to the data throughput improvement phase, the node being configured to switch back to the home channel at end of the periodic time cycle; and
  - if data throughput between the node and the other node cannot be improved, removing any channel switching schedule associated with the node such that the node remains on the home channel.

9. The method of claim 8, wherein the synchronized time is scheduled by the node according to a first local machine time of the node, the other node representing the synchronized time according to a second local machine time associated with the other node, first and second local machine times being independent of one another.

10. The method of claim 9, wherein calculating the channel-switching schedule further comprises:
- receiving, by the node, a beacon message over the home channel, the beacon message indicating a Media Access Control (MAC) time associated with the network protocol;
- determining, by the node, a difference between the first local machine and time and the MAC time;
- converting, by the node using the difference, a first pole point representing the synchronized time from a local machine time of the node into a MAC-based pole point time;
- communicating the MAC-based pole point time in the channel-switching schedule to the other node, receipt of the channel-switching schedule by the other node causing the other node to:
  - convert the MAC-based pole point time to a second pole point representing the synchronized time based on a local machine time of the other node;
  - switch from the home channel to the particular guest channel at the second pole point.

11. The method of claim 1, wherein for a node of the interconnected network nodes, optimizing the data throughput further comprises configuring the node to remain on a guest channel for an amount of time:
- (a) that is adjusted according to traffic volume on a corresponding communication link;
- (b) that is increased if traffic on the communication link increases, and
- (c) that is proportional to the periodic cycle time to ensure that any other traffic on the node is not affected.

12. The method of claim 11, wherein for the node ($N_i$), a total channel occupation time ($T_{Ni}$) represents transmission time and receiving time on all channel(s) associated with the node, wherein for a communication link ($l_{(i,j)}$) between $N_i$ and another node ($N_j$), total occupation time ($T_{(i,j)}$) represents channel occupation time on all channels, and wherein the method further comprises:
- determining a respective pole point for the node to switch from the home channel to the guest channel according to $T_g^{(i,j)} = w^{(i,j)} T_c$; and wherein:

$$T_{Ni} = \Sigma T_{(i,j)}, \forall T_{(i,j)} > 0,$$

a time weight of link $l_{(i,j)}$ on node $N_i$ is denoted as $$w_{N_i}^{(i,j)} = T_{(i,j)}/T_{Ni}, \text{ such that}$$

the time weight of link $l_{(i,j)}$ is denoted as $$w^{(i,j)} = \min(w_{N_i}^{(i,j)}, w_{N_j}^{(i,j)}); \text{ and}$$

wherein $T_g$ represents an amount of time that the node operates on the guest channel proportional to the periodic time cycle ($T_c$).

13. The tangible computer-readable medium comprising computer-program instructions executable by a processor, the computer-program instructions when executed for performing operations comprising:
- scheduling channel frequency switching operations for multiple network nodes ("nodes") as follows:
  - determining a maximum independent set (MIS) of communication links in the ad hoc network;
  - requesting, by a node of the nodes across a link of the MIS links, another node of the nodes to schedule channel switching at a proposed pole point to a particular guest channel of multiple guest channels,
    - wherein the proposed pole point is defined as a synchronized moment during a periodic time cycle, the periodic time cycle being based on a network beacon of a wireless network protocol, and wherein further, the proposed pole point for the node is based on a local machine time associated with the node, and wherein further still the proposed pole point for the other node is based on a different local machine time associated with the other node, and wherein each guest channel is orthogonal to a home channel used by all of the nodes to maintain network connectivity;

receiving a confirmation response from the other node; and responsive to receiving the confirmation response, switching to the particular guest channel at the proposed pole point to locally optimize data throughput in the ad hoc network.

14. The tangible computer-readable medium comprising computer-program instructions executable by a processor, the computer-program instructions when executed for performing operations comprising:

scheduling channel frequency switching operations for multiple network nodes ("nodes") as follows:

determining a maximum independent set (MIS) of communication links ("links") in the ad hoc network, wherein the MIS is a local MIS and each node determines a respective local MIS, and wherein the computer-program instructions further comprise instructions for:

establishing, by each node of the nodes, a respective local MIS based on traffic information associated with one or more neighbor nodes of the nodes within a one hop range of the node, the determining being independent of traffic information associated with any other node further than a one hop range from the nodes requesting, by a node of the nodes across a link of the MIS links, another node of the nodes to schedule channel switching at a proposed pole point to a particular guest channel of multiple guest channels, the proposed pole point being defined as a synchronized moment during a periodic time cycle, the periodic time cycle being based on a network beacon of a wireless network protocol, each guest channel being orthogonal to a home channel used by all of the nodes to maintain network connectivity;

receiving a confirmation response from the other node; and responsive to receiving the confirmation response, switching to the particular guest channel at the proposed pole point to locally optimize data throughput in the ad hoc network.

* * * * *